(12) United States Patent
Wu et al.

(10) Patent No.: US 7,754,299 B2
(45) Date of Patent: Jul. 13, 2010

(54) MULTILAYER POLYMER ARTICLES AND PROCESS FOR MAKING THE SAME

(75) Inventors: Wen Pao Wu, Pittsford, NY (US); Alan H. Forbes, Victor, NY (US)

(73) Assignee: Pactiv Corporation, Lake Forest, IL (US)

( * ) Notice: Subject to any disclaimer, the term of this patent is extended or adjusted under 35 U.S.C. 154(b) by 723 days.

(21) Appl. No.: 11/059,126

(22) Filed: Feb. 16, 2005

(65) Prior Publication Data
US 2006/0182910 A1 Aug. 17, 2006

(51) Int. Cl.
B32B 27/08 (2006.01)
B32B 27/32 (2006.01)
B32B 19/02 (2006.01)
B32B 19/04 (2006.01)

(52) U.S. Cl. ............... 428/34.7; 428/35.7; 428/36.4; 428/515; 428/516; 428/523; 428/688; 428/689; 428/699; 428/701; 428/702

(58) Field of Classification Search ............... 428/34.1, 428/34.4–34.7, 35.7, 36.4, 36.6, 411.1, 500, 428/515, 516, 517, 519, 521, 523, 688, 689, 428/699, 701, 702
See application file for complete search history.

(56) References Cited

U.S. PATENT DOCUMENTS

| 4,039,609 A | 8/1977 | Thiel et al. .................. 264/210 |
| 4,086,045 A | 4/1978 | Thiel et al. ................ 425/326.1 |
| 4,101,050 A | 7/1978 | Buckler et al. ................ 229/3.5 |
| 4,105,386 A | 8/1978 | Thiel et al. ................... 425/217 |
| 4,560,712 A | 12/1985 | Chiang ......................... 523/220 |
| 4,578,296 A | 3/1986 | Miyazaki et al. ............... 428/35 |
| 5,143,778 A | 9/1992 | Shuert ......................... 428/213 |
| 5,693,283 A * | 12/1997 | Fehn ........................... 264/513 |
| 5,743,986 A | 4/1998 | Colombo ............... 156/244.11 |
| 5,820,956 A * | 10/1998 | Hatakeyama et al. ...... 428/36.6 |
| 6,100,512 A | 8/2000 | Neculescu et al. ........... 219/725 |
| 6,120,863 A | 9/2000 | Neculescu et al. .......... 428/35.7 |
| 6,221,288 B1 | 4/2001 | Colombo .................. 264/37.32 |
| 6,255,636 B1 | 7/2001 | Cochran, II et al. ......... 219/730 |
| 6,459,075 B1 | 10/2002 | McCarthy et al. ........... 219/725 |
| 6,544,609 B1 | 4/2003 | Goldman .................... 428/35.7 |

(Continued)

*Primary Examiner*—Rena L Dye
*Assistant Examiner*—Walter B Aughenbaugh
(74) *Attorney, Agent, or Firm*—Baker Botts LLP

(57) ABSTRACT

A multilayer polymer composite structure that includes a first layer including a polymer and at least one mineral filler and a second layer including a polymer. A third layer is positioned between the first layer and the second layer, wherein the third layer includes a mixture of material from at least the first and second layers. Preferably, the third layer is formed by recycling and mixing excess material from the multilayer polymer structure. The second layer can further include a colorant. The multilayer polymer structure can also include a fourth and/or fifth layer comprising a high clarity polymer and/or a high gloss polymer that provides a glossy surface or a sealant polymer that provides surface capable of being sealed. In a preferred embodiment, the multilayer polymer structure is thermoformed into a multilayer polymer article such as a container. Preferably, the container is a drinking cup. The process for preparing a multilayer polymer article includes an in-line or continuous single line extrusion-thermoform-trim system, including direct sheet extrusion of the polymer layer having the mineral filler.

13 Claims, 3 Drawing Sheets

U.S. PATENT DOCUMENTS

| | | | |
|---|---|---|---|
| 6,600,143 B2 | 7/2003 | Hanada et al. | 219/725 |
| 6,624,272 B2 * | 9/2003 | Futami et al. | 526/307.3 |
| 6,627,278 B1 * | 9/2003 | Sandstrom et al. | 428/35.7 |
| 7,063,889 B2 * | 6/2006 | Yoshida et al. | 428/327 |
| 2004/0067288 A1 | 4/2004 | Wu et al. | 426/316 |

* cited by examiner

MULTILAYER POLYMER ARTICLES AND PROCESS FOR MAKING THE SAME

BACKGROUND OF THE INVENTION

1. Field of the Invention

The present invention relates to multilayer polymer articles and process for making the same. Particularly, the present invention is directed to a multilayer polymer article with at least one layer comprising a mineral filler. The invention further discloses a method wherein the compounding, thermoforming, and product trimming processes used to form the multilayered article are accomplished sequentially in a single line.

2. Description of Related Art

The use of single or multi-layered polymer composite sheets for fabricating containers is well known. Many of the composite sheets contain layers having organic and/or inorganic fillers therein. U.S. Pat. No. 4,101,050, incorporated in its entirety by reference herein, discloses a filled polystyrene laminate containing from about 5 to 50 weight percent filler, and containers thermoformed from the laminate. U.S. Pat. No. 4,578,296, incorporated in its entirety by reference herein, discloses a cup produced by thermoforming a polyolefin resin composition sheet including a layer containing the polyolefin resin, talc filler and titanium dioxide to achieve high whiteness, and another layer containing inorganic fillers to achieve reduced luster and transparency. U.S. Pat. No. 5,143,778, incorporated in its entirety by reference herein, discloses a multilayer structure with a core layer essentially free of filler and skin layers containing fillers.

Many of the known multilayer composites can be used to form containers such as drinking cups. One conventional drinking cup preferably includes a white interior surface and a colored exterior surface. The conventional drinking cup is usually fabricated of a blend of polystyrene and high impact polystyrene. An interior layer is typically provided, which is pigmented with titanium dioxide to achieve the white, opaque surface. One drawback of the prior art container is its lack of high impact capabilities. To enhance the impact characteristics of such conventional cups, it is known to incorporate a high percentage of rubber into the formulation. Higher rubber content, however, reduces the rigidity of the container and therefore requires more material to maintain the quality of the container. Similarly, the use of higher impact property materials, such as polyolefins, often results in higher material cost due to the lower moduli of such materials. Accordingly, more polyolefin material is required to maintain the quality of the container.

A variety of methods and systems are also known for manufacturing multilayer composite articles. U.S. Pat. No. 6,120,863, incorporated in its entirety by reference herein, discloses processes to extrude a single layer structure with a single-screw extruder, and a multilayer structure with multiple single-screw extruders. This patent further notes that subsequent off-line thermoforming processes may be used to convert the extruded sheet into suitable containers. Additionally, U.S. Pat. No. 6,120,863 describes a process using compounded polymer/mica mixtures to form a composite sheet of a mineral-filled polymer. Such mineral filled polymer sheets can be extruded by a single-screw extruder equipped with a flat die using a compounded polymer/filler mixture, usually in pellet form, which is produced in a twin screw compounding extruder. A typical in-line extrusion-thermoforming process is described in U.S. Pat. No. 4,039,609, incorporated in its entirety by reference herein. This process generally consists of extruding a web of thermoplastic sheet with one or more single screw extruders to create a single or multi layered laminated sheet. The sheet is then continuously fed to a thermoforming device and subsequently trimmed.

As evident from the related art, it is desirable to produce a multilayer container having excellent rigidity and high impact properties without the need for more materials and higher costs. It is also desirable to achieve a white, opaque interior layer and pigmented exterior layer for the container while reducing material costs. To further reduce costs, it is desirable to use a more efficient and economic manufacturing process to produce a multilayer polymer article having mineral fillers therein.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied and broadly described, the invention includes a multilayer polymer composite structure that comprises a mineral filler in at least one layer. The multilayer polymer composite structure includes a first layer comprising at least one polymer and at least one mineral filler and a second layer comprising at least one polymer. In accordance with a preferred embodiment, the second layer further includes at least one colorant. A third layer is positioned between the first layer and the second layer, wherein the third layer includes a mixture of material from at least the first and second layers. Preferably, the third layer is formed by recycling and mixing excess material from the multilayer polymer composite. Accordingly, the third layer includes at least the polymers of the first and second layers and the mineral filler of the first layer. If at least one colorant is added to the second layer, then the third layer also includes the at least one colorant of the second layer. The third layer can also include an additional mineral filler and/or polymer that is added to the mixture of material from the multilayer polymer composite.

In accordance with another aspect of the invention, the multilayer polymer composite structure further includes a fourth layer in contact with the first or the second layer. The fourth layer includes a high clarity and/or high gloss polymer that provides a glossy surface or a sealant polymer that provides a surface capable of being sealed by a lidding or sealing film.

In accordance with an additional aspect of the invention, the multilayer polymer composite structure further includes a fifth layer in contact with the other of the first layer or the second layer. The fifth layer includes a high clarity and/or high gloss polymer that provides a glossy surface or a sealant polymer that provides a surface capable of being sealed by a lidding or sealing film.

In accordance with a preferred embodiment, the polymers used in the multilayer composite structure are one or more compatible polyolefins. If incompatible polymers are used, then tie layers can be disposed between the layers.

In accordance with another aspect of the invention, a multilayer polymer article is provided comprising a first layer including at least one polymer and at least one mineral filler, a second layer including at least one polymer, and a third layer disposed between the first layer and the second layer. The third layer includes a mixture of material from at least the first layer and the second layer. Preferably, the third layer is formed by recycling and mixing excess material from the multilayer polymer composite. Accordingly, the third layer includes at least the polymers of the first and second layers and the mineral filler of the first layer. In accordance with a preferred embodiment, the second layer further includes at least one colorant. Accordingly, the third layer can also include the colorant of the second layer. Optionally, the third layer includes an additional mineral filler and/or polymer that is added to the mixture of material from the polymer composite. In accordance with one embodiment of the invention, the multilayer polymer article is a container. In accordance with a preferred embodiment, the container is a cup.

Incorporating the mineral filler in the first layer of the multilayer polymer composite structure used to fabricate a composite container results in a container that has excellent rigidity and impact properties. Further enhancing the physical characteristics of the container is the positioning of the layers within the article. The use of an inexpensive mineral filler not only provides for improved physical properties of the container, but also reduces the material costs of the multilayer polymer article because less polyolefin material is required to maintain rigidity.

In accordance with one embodiment of the invention, the first layer is the inner layer of the multilayer polymer article. In accordance with a preferred embodiment of the invention, the inner layer is white and opaque. As embodied herein, and in accordance with one aspect of the invention, the mineral filler is high brightness filler that imparts the white and opaque property to the inner layer. Optionally, a relatively small amount of titanium dioxide may be used in the first layer.

Further in accordance with the invention, the second layer is the outer layer of the multilayer composite article. As embodied herein, if colorant is present in the second layer, it imparts a vivid color to the exterior of the multilayer composite article.

In accordance with an additional aspect, the invention includes a process for preparing a multilayer polymer article. The process comprises the steps of extruding a first layer including at least one polymer and at least one mineral filler; extruding a second layer including at least one polymer; and extruding a third layer including a mixture of material from at least the first and second layers. The third layer is preferably formed by recycling the trimmed excess material from the multilayer composite for the mixture of the third layer and extruding the mixture using a single-screw extruder. Optionally, however, additional mineral filler can be added to the mixture and extruded using a twin-screw extruder. The process further includes combining the extruded first, second and third layers to form a multilayer thermoplastic web, wherein the third layer is disposed between the first layer and the second layer; heating the multilayer thermoplastic web to a temperature sufficient for thermal shaping; thermal shaping the multilayer thermoplastic web into at least one shaped article; and trimming the shaped article to remove residual web material. In accordance with one aspect of the invention, the first layer is extruded through direct extrusion using a twin-screw extruder and the second layer is extruded using a single-screw extruder.

In accordance with a further aspect of the invention, the process further includes performing all steps in single in-line system. In accordance with a preferred embodiment of the invention, the article is a container.

In accordance with an additional aspect, the invention includes a process for preparing a polymer article having at least one layer that includes a mineral filler, through a single in-line extrusion-thermoforming process with direct sheet extrusion of a polymer web including a polymer and at least one mineral filler using a twin-screw extruder. The process includes extruding a polymer web including a polymer and at least one mineral filler through direct extrusion using a twin-screw extruder; heating the multilayer thermoplastic web to a temperature sufficient for thermal shaping; thermal shaping the multilayer thermoplastic web into at least one shaped article; and trimming the shaped article to remove residual web material.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the product of the invention and process for making same. Together with the description, the drawings serve to explain the principles of the invention.

DETAILED DESCRIPTION OF THE PREFERRED EMBODIMENT

Reference will now be made in detail to the present preferred embodiments of the invention, examples of which are illustrated in the accompanying drawings. A detailed description of the multilayer polymer article of the present invention and the process of manufacturing the article will be provided in conjunction with the description of the multilayer polymer composite structure.

The methods and apparatus presented herein are used for manufacturing a multilayer polymer article having a first layer including a polymer and a mineral filler, and one or more additional layers disposed relative to the first layer. Particularly, and as embodied herewith, the multilayer polymer article further comprises a second layer including a polymer, and a third layer disposed between the first and second layers. The third layer is a core or middle layer preferably formed of a mixture of material from at least the first and second layers. Accordingly, the third layer includes at least the polymer and mineral filler of the first layer and the polymer of the second layer. The third layer preferably is formed by recycling excess material from the multilayer composite, and optionally adding additional polymer and/or filler to the recycled material. In accordance with a preferred embodiment of the invention, the second layer further includes a colorant. If colorant is present in the second layer, then the third layer further includes the colorant of the second layer.

Incorporating at least one mineral filler in the first layer of the multilayer polymer composite used to fabricate the container results in a container that has improved physical properties such as, for example, rigidity and impact property. Further enhancing the characteristics of the container is the positioning of the layers. The use of the at least one mineral filler not only provides for improved physical properties of the container, but also reduces the material costs of the multilayer polymer article.

Figure 1:
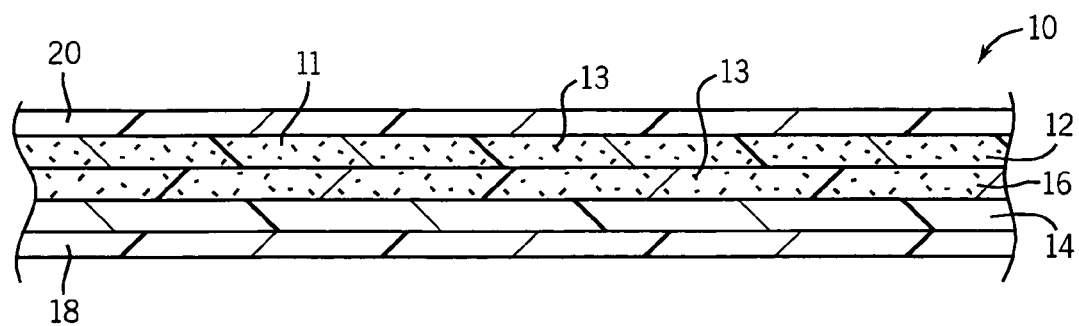
FIG. 1 is a cross-sectional view of a representative embodiment of a multilayer polymer composite structure in accordance with the invention.

For purpose of explanation and illustration, and not limitation, an exemplary embodiment of the composite structure in accordance with the invention is shown in FIG. 1, and is designated generally by reference character 10. FIG. 1 illustrates a cross-sectional view of a multilayer composite sheet formed in accordance with the present invention. Particularly, and for purposes of illustration and not limitation, FIG. 1 illustrates the cross-sectional view of the multilayer thermoplastic web used to form the articles of the present invention.

As embodied herein and as depicted in FIG. 1, the multilayer polymer composite structure 10 of the present invention comprises a first layer 12, a second layer 14 and a third layer 16. The first layer 12 includes at least one polymer 11 and at least one mineral filler 13.

Any of a variety of suitable polymers can be used for the first layer of the composite structure of the present invention, including but not limited to, propylene polymers, such as, for example polypropylene homopolymers, polypropylene random copolymers, or polypropylene impact copolymers, ethylene polymers, such as, for example, high density polyethylene, medium density polyethylene, or low density polyethylene, polybutenes and copolymers thereof, polystyrenes and copolymers thereof, polyesters, and mixtures or copolymers thereof. In accordance with a preferred embodiment of the invention, the polymer having high rigidity and high impact characteristics is selected for the multilayer polymer article. For example, and in the preferred embodiment represented herein, the polymer of the first layer 12 is polypropylene. In yet another embodiment of the invention, the composite structure can comprise more than one compatible polymer such as polypropylene and polyethylene.

Suitable mineral fillers for the first layer 12 include, but are not limited to, talc, calcium carbonate, calcium sulfate, or calcined clay. Preferably, the filler is selected to enhance the physical properties of the article and provide for improved rigidity and impact properties. Examples of suitable fillers include, but are not limited to, CIMPACT® and STELLAR® series of talc from Luzenac America, LLC., Englewood, Colo.; BT-22xx series of talc from IMI FABI, LLC., Benwood, W.V.; Camel-Fine™ ST and Camel-CAL™ calcium carbonate from Imerys, Roswell, Ga.; and OMYACARB® calcium carbonate from Omya, Inc., Proctor, Vt.

In accordance with a preferred embodiment of the invention, the mineral filler used also imparts a high degree of whiteness to the layer, particularly if the first layer constitutes an inner or interior layer of the article of the present invention. For example, it is desirable for the first layer 12 to define the interior layer of an article, such as a food container or beverage cup, due to its composition. It therefore is preferable that the filler used imparts a high degree of whiteness and opacity to the inner layer for purpose of appearance and aesthetics. Should the selected filler not impart the desired degree of whiteness or opacity, however, titanium dioxide can be added to the first layer in a sufficient amount to produce the desired characteristic. Preferably, the mineral filler is present in the amount of 20 to 70 weight percent, and more preferably in the amount of 30 to 60 weight percent in the first layer. If titanium dioxide is used in the first layer, an amount of between about 0 to 5 weight percent is desired.

In further accordance with the invention, the second layer 14 comprises at least one polymer. The second layer preferably comprises a polymer that is substantially the same as or at least compatible with the polymer in the first layer 12. In accordance with a preferred embodiment, the second layer further comprises at least one colorant. The colorant can be any suitable material capable of providing a vivid color, including, but not limited to any color of the spectrum, as well as white and black, to the second layer of the composite structure. The colorants that can be used in the present invention include, but are not limited to, pigments or dyes. The colorants may be used in a variety of modes, including but not limited to, dry color, conventional color concentrates, liquid color and precolored resin. The colorant is provided in a sufficient concentration to provide the desired color. Preferably, the loading for the colorant is about 1 to 10 weight percent in concentrate form. In a preferred embodiment, the second layer comprises at least one colorant further having a high quality luster. In accordance with a preferred embodiment of the invention, in order to maintain a lustrous surface and if a colorant is present, the second layer is preferably free of mineral fillers.

In accordance with a further embodiment of the invention, the second layer can further include a mineral filler. In this regard, the composition of the second layer can be identical to the composition of the first layer.

In further accordance with the invention, the third layer 16 is disposed or sandwiched between the first 12 and second 14 layers. In this manner, the third layer 16 defines a core for the composite structure. The third layer 16 can be formed of any suitable polymer material. Preferably, and further in accordance with the invention, the third layer 16 is formed from a mixture of the excess recycled material or trim skeleton of the multilayer polymer composite. More preferably, the third layer 16 is formed by recycling and mixing excess material from at least the first layer 12 and the second layer 14. Hence, and in accordance with a preferred embodiment of the invention, the third layer 16 comprises at least the polymer components of the first and second layers, the mineral filler 13 of first layer and, if present, the colorant of the second layer. The third layer can also comprise the polymer or resin components of optional layers 18 and 20, described in further detail herein or any additional layers present. In this manner, the mineral filler or fillers of the third layer 16 therefore at least include the same fillers as in the first layer.

The third layer can also comprise additional polymer or polymers and/or mineral filler or fillers that can be added to the mixture. The additional polymer added can be identical to or compatible with the polymers in the first and second layers. Additional mineral filler or fillers can be introduced as a pre-compounded mineral filled polymer and, therefore, a single-screw extruder preferably is used to extrude the third layer. Alternatively, the additional mineral filler or fillers can be introduced directly as a mineral filler and, therefore, a twin-screw extruder preferably is used to extrude the third layer. Preferably, the mineral filler in this layer is present in the amount of 10 to 40 weight percent, and more preferably from 15 to 35 weight percent.

Figure 3:
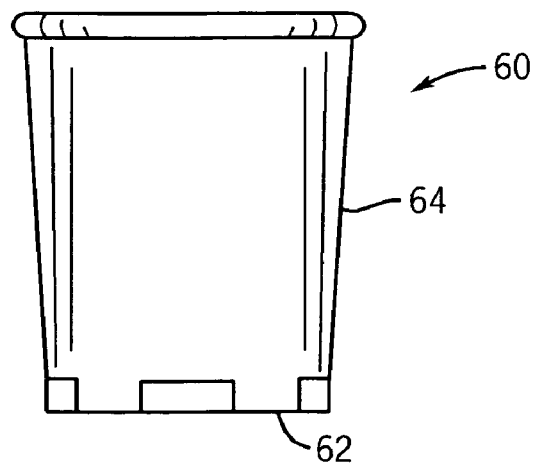
FIG. 3 is a side view of a representative embodiment of the multilayer polymer article of the present invention.
Figure 4:
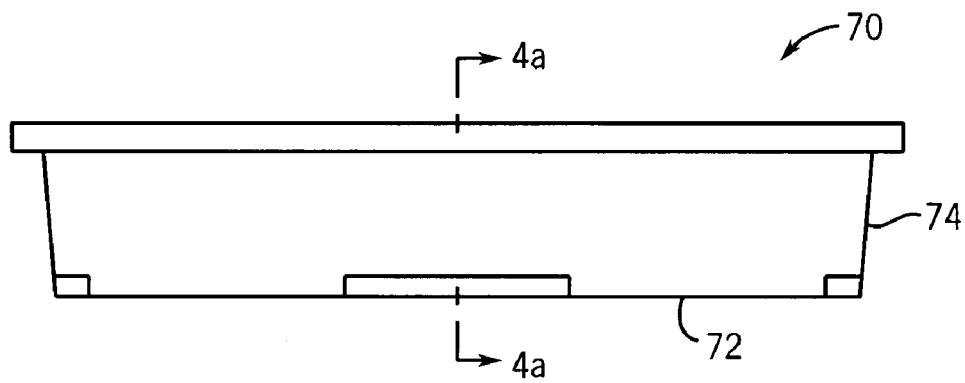
FIG. 4 is a side view of an alternative embodiment of the multilayer polymer article of the present invention and FIG. 4A is a cross-sectional view of an alternative embodiment of the multilayer polymer article of the present invention.
Figure 4A:
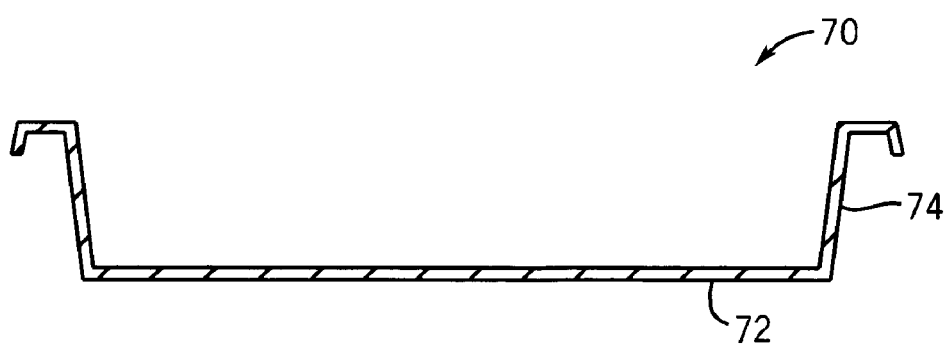
Figure 5:
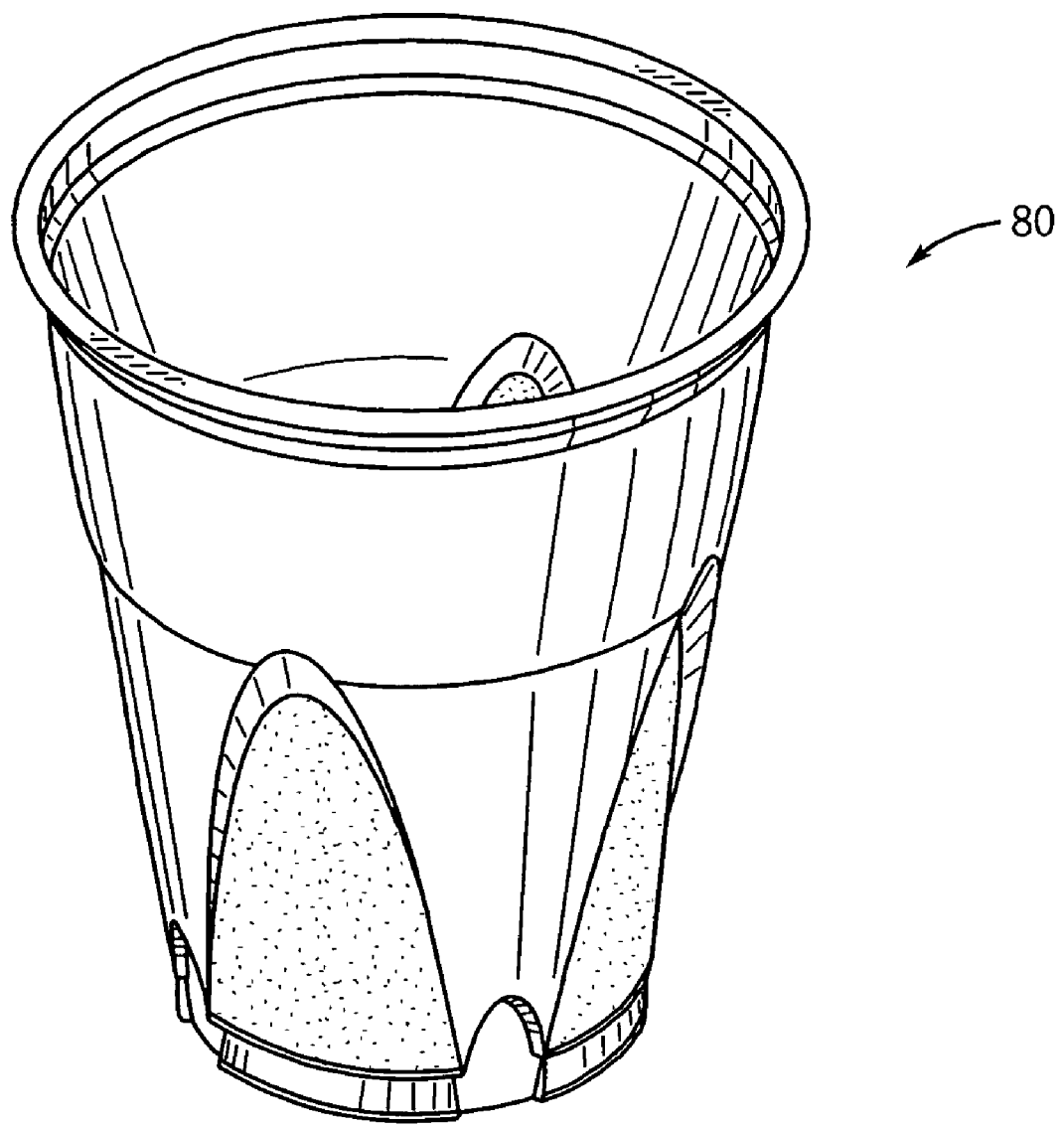
FIG. 5 is a perspective view of an alternative embodiment of the multilayer polymer article of the present invention.

Additional layers of suitable material also can be included, disposed between or adjacent the first, second and/or third layers, in accordance with the present invention. For example, and not by limitation, the multilayer composite structure optionally includes fourth and/or fifth outer layers. These outer layers can be defined by a gloss polymer layer and/or a sealant layer. In accordance with a preferred embodiment, as depicted in FIG. 1, the fourth layer 18 and the fifth layer 20 are clear cap layers that provide a glossy surface to the second layer 14 and first layer 12, respectively. In accordance with a further embodiment, the fourth and/or fifth layers are sealant layers, which provide surfaces capable of being sealed by a sealing or lidding film for the second layer and/or first layer, respectively. The sealant layer provides a sealing surface that is compatible with a sealing or lidding film. Preferably, the first layer 12 defines the inner surface of the container, which is exposed at its upper edge by a rolled lip configuration as depicted in FIGS. 3 and 5, or a flange configuration as depicted in FIGS. 4 and 4a. To enhance sealing when a sealing film or lidding film (not shown) is attached to the container along a flange or lip configuration, the fifth layer preferably is a sealant layer in accordance with the invention. If a sealing or lidding film is to be used with the container of the present invention for engagement with the fifth layer along a flange or lip configuration, then the fifth layer or sealant layer is selected to be compatible with the material of the sealing or lidding film to provide suitable seal strength between the sealant layer and the lidding material. Similarly, if the sealing or lidding film is expected to engage the outer surface of the container, then the fourth layer is preferably a sealant layer. The use of lids, lidding films or sealing films is described in U.S. Patent Publication No. US 2004/0067288, incorporated by reference herein. Suitable materials for the fourth and/or fifth layers include, but are not limited to, high clarity polypropylene, polyethylene, propylene-ethylene copolymers, styrene copolymers, such as, for example, styrene-butadiene copolymers or styrene-ethylene-butadiene copolymers. Although not necessary, the polymer used for the fourth and fifth layer can be both a high gloss or high clarity polymer and a sealant polymer.

In addition, the multilayer composite structure can optionally include, for example, one or more tie layers disposed between the first and third layers and the third and second layers. The tie layers are typically used if the polymers in the various layers are incompatible. The tie layers comprise tie layer resins, including but not limited to, ethylene vinyl acetate and ethylene methyl acrylate.

As presented in FIG. 1, the various layers of the multilayer composite structure are combined to form a single web material. As discussed in greater detail below, any of a variety of known techniques can be used to extrude or otherwise form these various layers as a single structure. Furthermore, the amount in which each layer constitutes the whole of the structure will depend upon the needs or intended use of the multilayer composite, as well as the number of layers provided. For example, and as embodied herein with reference to FIG. 1 and in accordance with a preferred embodiment of the invention, the first layer constitutes about 10 to about 40 weight percent, and more preferably about 15 to about 30 weight percent, of the overall multilayer composite structure. In accordance with a preferred embodiment of the invention, the second layer constitutes about 5 to about 30 weight percent, and more preferably about 10 to about 20 weight percent, of the overall structure of the multilayer composite structure. In accordance with a preferred embodiment of the invention, the third layer constitutes about 30 to about 70 weight percent, and more preferably from about 35 to about 60 weight percent, of the entire structure of the multilayer composite structure. In accordance with a preferred embodiment of the invention, each of the fourth and fifth layers constitute about 0 to about 10 weight percent of the overall structure of the multilayer composite structure. In accordance with a preferred embodiment of the invention, the overall mineral filler content of the multilayer composite structure is about 20 to about 45 weight percent.

Particularly, and for purpose of illustration, a preferred embodiment of the invention includes a multilayer polymer composite having a first layer comprising about 28 weight percent of the total multilayer composite and including about 47 weight percent of polypropylene, about 50 weight percent talc and about 3 weight percent titanium dioxide; a second layer comprising about 12 weight percent of the total multilayer composite and including about 95 weight percent polypropylene and about 5 weight percent colorant in concentrate form; a third layer comprising about 55 weight percent of the total multilayer composite and including about 55 weight percent polypropylene, about 11 weigh percent high gloss polypropylene, about 31 weight percent talc, about 2 weight percent titanium dioxide and about the equivalent of 1 weight percent colorant in concentrate form; and a fourth layer adjacent to the second layer comprising high gloss polypropylene, wherein the fourth layer comprises about 5 weight percent of the total multilayer composite.

Optionally, additives such as waxes, fluorinated polymers and other specialty lubricants are added to the polymer matrix of each layer to improve the viscosity of the polymer matrix and to improve throughput. It is understood that additional additives can be used without departing from the spirit or scope of the invention. Additional layers or features of suitable material can be added to the multilayer composite structure of the invention as desired.

Incorporating the mineral filler in at least one layer of the multilayer thermoplastic web results in articles manufactured therefrom that have excellent rigidity, enhanced impact property and are less expensive to manufacture. Hence, the multilayer composite structure or web is particularly suitable for the manufacture of thermoformed articles having a combination of desired characteristics, such as high impact resistance with a high degree of whiteness on one surface and, if desirable, a vivid color and luster on an opposite surface.

Another aspect of the present invention therefore includes an article formed from the multilayer thermoplastic structure or web. The article of the invention preferably is formed to contain a food or beverage product placed therein. For purposes of illustration and not limitation, the article can include a drinking vessel such as a cup 60, 80 as depicted in FIGS. 3 and 5, or a food container such as a tray 70 depicted in FIGS. 4 and 4a. The article generally has a base 62, 72 and a peripheral side wall 64, 74 extending from the base. The articles of the present invention can be any conventional or suitable container, including but not limited to, cups, containers, bowls, trays, plates and buckets. FIG. 5 illustrates a representative embodiment of a drinking cup of the present invention, further disclosed in U.S. design application No. 29/215,059 filed on Oct. 12, 2004, and incorporated by reference herein. It shall be understood that the embodiment of FIG. 5 is representative only and that modifications and changes can be made without departing from the spirit or scope of the present invention. Preferably, the articles of this invention are formed from a multilayer thermoplastic web which has been extruded and then thermoformed using a continuous inline process described in further detail herein.

Referring to FIGS. 3, 4 and 5 by way of example only, the article manufactured from the composite structure or web will generally have an "outer" surface and an "inner" surface. Each surface is typically exposed to different types of wear. The inner surface is typically exposed to or may be in direct contact with the food or beverage contained therein. The outer surface is opposite the inner surface and is typically in contact with an external body such as a counter, shelf, packaging machinery or an individual. With reference to the multilayer composite structure of the invention, the first layer 12 preferably is aligned to define the inner surface of the article. In this manner, the inner surface will have a high degree of whiteness and high impact characteristics. As previously described, the first layer may also define an engaging surface along a rolled lip, a flange or the like, the first layer including a sealant layer disposed adjacent thereto for engagement with a lid, sealing film or lidding film. In accordance with a preferred embodiment of the invention, the second layer 14 of the multilayer composite structure constitutes the outer surface of the article of the present invention. As such, if colorant is present, the second layer imparts a vivid color to the exterior of the article.

Figure 2:
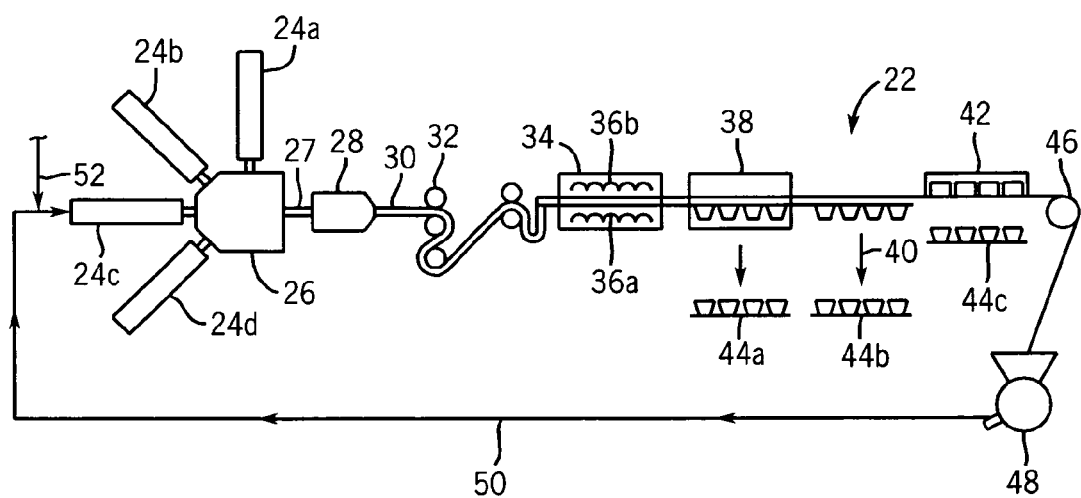
FIG. 2 is schematic representation of an in-line extrusion-thermoforming process with direct sheet extrusion of a polymer layer having a mineral filler in accordance with another aspect of the invention.

As embodied herein and in accordance with another aspect of the invention, FIG. 2 is a schematic representation of an in-line or continuous single line extrusion-thermoform-trim system and related process 22, including direct sheet extrusion of a polymer layer having the mineral filler for forming the article of the present invention. As embodied herein, the number of extruders (24a, 24b, 24c and 24d) at the extrusion station will depend on the number and composition of layers of the thermoplastic web. Typically, one extruder is used for each layer having a different composition.

In accordance with a preferred embodiment of the invention, at least one extruder is a twin-screw to form a mineral-filled polymer layer. The twin-screw extruder provides sufficient mixing action to effectively cause the wetting and dispersion of mineral filler into a polymer matrix. The twin-screw or double-screw extruder can be of the co-rotating or counter-rotating type, such that each type is equipped with different screw flight elements which are appropriate for the feed, mixing and melt metering zones of the process. A suitable twin-extruder is disclosed in U.S. Pat. No. 5,743,986 to Colombo, incorporated in its entirety by reference herein.

When a single layer structure having a mineral filler and a polymer is desired, a single twin-screw extruder is used. A flat sheet die preferably is disposed at the end of the twin-screw extruder so that a single composite web having mineral fillers can be directly extruded.

When a multilayered composite structure is desired, a feed block 26 or co-extrusion head is provided at the extrusion station to receive the material exiting the at least one extruder and to direct the material flow to form a multilayer melt stream 27. Typically, for every layer having a different composition a different extruder is used, i.e. a composite web having layers with three different compositions will use three extruders. A combination of twin and single screw extruders can be used depending on the composition of the layers in the multilayer composite web. A twin-screw extruder is preferred for each mineral-filled polymer layer. The extruders are generally arranged relative to each other depending on the position and relationship of the corresponding layers in the multilayer composite structure. Referring to FIG. 2, and in accordance with a preferred embodiment for forming a multilayer web as depicted in FIG. 1, the first layer is coextruded into the multilayer structure using a twin-screw extruder. The second and third layers are typically coextruded to form the multilayer structure using singe-screw extruders. However, if additional mineral filler is added to the material mixture of the third layer, then the third layer is preferably coextruded into the multilayer structure using a twin-screw extruder.

The output ends of the extruders are fed into a feed block 26 to join various layers together as embodied herein. If desired, one extruder can serve to supply material to several passages of the feed block if the composition of two or more layers are identical. This is accomplished by using appropriate elements as known in the art to divide a single stream of molten polyolefin material into two or more separate streams. Such elements include, for example, a forked connection, a head, a manifold or the like. A multilayer extruded sheet therefore can be formed by combining a feedblock with proper melt piping and manifold arrangements at the extrusion station.

As embodied herein, the output end of the feedblock is fed through a die 28. The die 28 produces a continuous multilayer thermoplastic web 30. Any die suitable for use in the present invention may be used. A flat sheet die is preferred. The multilayer thermoplastic web 30 exiting the die is then processed, if necessary such as by drawing, and fed to a roll or stabilizing stack 32 to stabilize the thermoplastic web by cooling. Generally, the surface of the thermoplastic web is also smoothed by the roll stack.

In accordance with the process and system embodied herein, the thermoplastic web 30 then advances to a heating device or station 34 to subject the stabilized web to a temperature compensation treatment and set the proper surface temperature required for thermal shaping. In thermal forming, it is extremely desirable that there be as uniform a temperature across the web surface as possible. Due to the in-line process of the invention, the web 30 passing through the heating device 34 is relatively warm and therefore requires less heat to raise the surface temperature of the web to the temperature required for thermal shaping. Preferably, the thermoplastic web passes horizontally through the heating device 34 and is subjected to heat or similar energy by various heating elements 36a, 36b. As understood by those skilled in the art, any suitable heating element or technique can be used. In a preferred embodiment, the heating element comprises ceramic encapsulated heaters with parallel reflective members. These reflectors can be polished aluminum, which are excellent heat reflectors. Furthermore, depending on the characteristics and properties of the thermoplastic web, it may be beneficial or necessary to provide an air circulation chamber to maintain the plastic web at a constant temperature. This air circulation chamber does not necessarily increase temperature overall, but rather maintains a desired temperature by compensatively distributing warm air over the web surface. For example, it is generally desirable or necessary to shape polyolefins, such as polyethylene and polypropylene, at high forming temperatures; therefore, the polyolefins are generally heated with air support, and require even temperature distribution over the shaping surface.

The web 30 is then advanced and subjected to thermal shaping at the thermal shaping station or thermoformer 38. For example, and as embodied herein, a mechanically acting stretching element is applied to one web surface at the thermoformer to urge the opposite web surface against a shaping tool for further cooling. Alternatively, a positive pressure technique can be used, wherein the web is subjected at the shaping station to compressed air at one of the surfaces to press the opposite surface against the shaping tool surface and then further cooled. Any thermal shaping process or any thermal shaping equipment known by those skilled in the art may be applied to form the container of the present invention.

In accordance with a preferred embodiment of the invention, the shaped articles are then trimmed of excess web material and removed from the web to form the final articles within the thermal shaping station. Accordingly, shaping, trimming and removal of the shaped articles from the web occurs in-place in the thermal shaping station to form the final articles 44a. In accordance with an alternative embodiment, the shaped web 40 is partially trimmed within the shaping station 38 such that the shaped articles are attached to the web by a relatively small amount of material. The web then exits the shaping station 38 and the shaped articles 40 are punched from the web, preferably using a pneumatically driven punching device, to form the final articles 44*b*. Accordingly, partial trimming occurs within the shaping station and punching occurs directly downstream of the shaping station to form the final articles 44*b*. In accordance with yet another embodiment, downstream of the thermal shaping station, the shaped web 40 is fed into a stamping or trimming station 42, where the shaped articles are trimmed of excess material and punched from the web to form the final articles 44*c*. In a preferred embodiment, the shaped containers are then processed through a stacker or stacking device (not shown). Each of these three alternatives are depicted schematically and collectively in FIG. 2 for purpose of comparison. Any trimming, stamping or punching process or any trimming, stamping or punching equipment known by those skilled in the art may be applied to form the container of the present invention.

Following trimming of the shaped articles, the residual web 46 is brought to a receiving station 48 equipped to reduce and process the residual web material into granular form or the like for recycling. The residual material 50 is then fed back and recycled to an extruder. In a preferred embodiment, this residual material is used to form the third layer of the multilayer composite article. Optionally, additional polymer and/or filler 52 can be added to the recycled residual material to form the third layer.

The process of extruding a thermoplastic web using multiple single-screw extruders followed by thermoforming is disclosed in U.S. Pat. Nos. 4,086,045 and 4,105,386, incorporated by reference herein. A known in-line extrusion/thermoforming system for a single screw extruder system is commercially available from ISAP OMV Group of Parona, Italy. In addition, a similar in-line system is also available from Adolf Illig of Heibronn, Germany.

As discussed above, in accordance with a preferred embodiment, the multilayer polymer article is manufactured using an in-line extrusion-thermoforming process with direct sheet extrusion of the polymer layer with the mineral filler. Combining the direct sheet extrusion of a layer containing mineral fillers with an inline extrusion thermoforming process provides for a more efficient and cost effective manufacturing process.

It will be apparent to those skilled in the art that various modifications and variations can be made in the method and system of the present invention without departing from the spirit or scope of the invention. Thus, it is intended that the present invention includes modifications and variations that are within the scope of the appended claims and their equivalents.

The invention claimed is:

1. A multilayer polymer composite structure comprising:
    a first layer including at least one polymer and at least one mineral filler sufficient to provide whiteness to the first layer and increase rigidity of the structure;
    a second layer including at least one polymer and at least one colorant; and
    a third layer disposed between the first layer and the second layer, the third layer including a mixture of material from at least the first layer and the second layer, the third layer consisting of the at least one polymer of the first layer, the at least one polymer of the second layer, the at least one mineral filler of the first layer, and the at least one colorant of the second layer, wherein the at least one polymer of the first layer is different from the at least one polymer of the second layer.

2. The multilayer polymer composite structure of claim 1, further comprising a fourth layer disposed adjacent at least one of the first layer or the second layer, the fourth layer selected from the group consisting of a high clarity polymer, a high gloss polymer and a sealant polymer.

3. The multilayer polymer composite structure of claim 2, further comprising a fifth layer disposed adjacent the other of the first layer or the second layer, the fifth layer selected from the group consisting of a high clarity polymer, a high gloss polymer and a sealant polymer.

4. The multilayer polymer composite structure of claim 1, wherein the at least one polymer of the first layer is a polyolefin.

5. The multilayer polymer composite structure of claim 4, wherein the polyolefin is polypropylene.

6. The multilayer polymer composite structure of claim 1, wherein the mineral filler is selected from the group consisting of talc, calcium carbonate, calcium sulfate and calcined clay.

7. The multilayer polymer composite structure of claim 6, wherein the first layer further includes titanium dioxide.

8. The multilayer polymer composite structure of claim 1, wherein the first layer comprises about 20 to 70 weight percent of the at least one mineral filler.

9. The multilayer polymer composite structure of claim 1, wherein the second layer comprises a sufficient amount of at least one colorant to provide the desired color.

10. The multilayer polymer composite structure of claim 1, wherein the third layer comprises about 10 to 40 weight percent of the at least one mineral filler.

11. The multilayer polymer composite structure of claim 1, wherein the structure is a multilayer thermoplastic web.

12. The multilayer polymer composite structure of claim 1, wherein the at least one polymer of the second layer is a polyolefin.

13. The multilayer polymer composite structure of claim 1, wherein the at least one mineral filler further improves impact resistance of the structure.

* * * * *